United States Patent [19]
Takagi et al.

[11] 3,890,404
[45] June 17, 1975

[54] METHOD FOR PRODUCING ISOPRENE

[75] Inventors: Kazumi Takagi; Teruo Matsuda, both of Niihama, Japan

[73] Assignee: Sumitomo Chemical Co., Ltd., Japan

[22] Filed: Feb. 8, 1973

[21] Appl. No.: 330,687

Related U.S. Application Data

[63] Continuation-in-part of Ser. No. 79,700, Oct. 9, 1970, abandoned.

[30] Foreign Application Priority Data

Oct. 9, 1969   Japan.............................. 44-80884
Jan. 20, 1970   Japan.............................. 45-5572
Feb. 6, 1970   Japan.............................. 45-10929

[52] U.S. Cl. ............................................... 260/681
[51] Int. Cl. ............................................... C07c 1/24
[58] Field of Search .................................. 260/681

[56] References Cited
UNITED STATES PATENTS

| | | |
|---|---|---|
| 1,923,569 | 8/1933 | Mueller-Cunradi et al. ........ 260/681 |
| 2,229,652 | 1/1941 | Halbig et al. ........................ 260/681 |
| 2,335,691 | 11/1943 | Mottern ............................... 260/681 |
| 2,368,494 | 1/1945 | Rosen et al. ......................... 260/681 |
| 3,494,975 | 2/1970 | Kronig et al. ........................ 260/681 |

*Primary Examiner*—Paul M. Coughlan, Jr.
*Attorney, Agent, or Firm*—Craig & Antonelli

[57] ABSTRACT

A method for producing isoprene which comprises reacting isobutene with a reactant selected from the group consisting of formaldehyde, isoprene glycol and its acid esters at a molar ratio of isobutene to reactant of 1 : 1 to 10 : 1 in a medium of water or its mixture with t-butanol in a liquid phase at a temperature of from 110°C to 180°C and under autogenetic pressure in contact with a catalyst which is an acidic substance under said reaction conditions, the concentration of the catalyst being 1 to 5 % by weight. By such method, isoprene is produced in an excellent yield.

28 Claims, No Drawings

METHOD FOR PRODUCING ISOPRENE

This is a continuation-in-part application of Ser. No. 79,700, filed Oct. 9, 1970, now abandoned.

The present invention relates to a method for producing isoprene. More particularly, it relates to a method for the production of isoprene from isobutylene and formaldehyde, or isoprene glycol or its acid ester by the liquid phase reaction at a relatively high temperature.

For the production of isoprene from isobutene and formaldehyde, there have been known a gas phase process and a liquid phase process. As the gas phase process, various proposals including the one described in U.S. Pat. No. 2,389,205 have been made, but none of them has been actually industrialized because of the poor yield of the objective isoprene and the shortness of the catalyst life. Further, any liquid phase process such as the one described in U.S. Pat. No. 2,335,691 has not been considered to be practical because of the low yield of the objective isoprene and the lengthiness of the reaction time.

As the results of the reinvestigation on the known processes, it has been recognized that, in case of the gas phase process, a high reaction temperature is required essentially so that the starting formaldehyde is readily decomposed to result in the decreased yield of isoprene and the decomposition products are deposited on the surface of the catalyst to cause the depression of the catalytic activity. In case of the liquid phase process, formaldehyde can be present stably for a long time so that the depression of the catalytic activity as seen in the gas phase process is avoided. However, the use of an aqueous solution of sulfuric acid as the acid catalyst at the conventional range of reaction temperatures, e.g., as described in U.S. Pat. No. 2,335,691, requires a long reaction time and affords only a black reaction mixture, from which the proceeding of side reactions may be assumed.

It has now been found that the treatment of isobutene and formaldehyde, or isoprene glycol or its acid ester in a liquid phase in the presence of a catalyst at a temperature from 110° to 180°C affords isoprene in excellent yields. The present invention is based on this finding.

According to the present invention, there is provided a method for producing isoprene which comprises reacting isobutene and formaldehyde, or isoprene glycol or its acid ester in a liquid phase in the presence of a catalyst at a temperature from 110° to 180°C.

As noted above, the reaction temperature in the process of this invention is from 110° to 180°C. This is unexpectedly high, compared with the one as conventionally adopted, e.g., as in U.S. Pat. No. 2,335,691. When the reaction temperature is lower than 100°C, the reaction rate becomes too slow, a long time is required for completion of the reaction and various side reactions take place. Thus, the objective isoprene can not be produced in high yields. When the reaction temperature is higher than 180°C, the reaction pressure is much increased and the produced isoprene becomes unstable so that side reactions including Diels-Alder reaction and polymerization proceed resulting in the decrease of the yield of isoprene. Even when the reaction temperature is maintained between 110° and 180°C, there may proceed to a certain extent side reactions, mainly Diels-Alder reaction. However, the by-products resulting from such side reactions can be recycled to the reaction system whereby the equilibrium in the side reactions is favorably controlled to attain higher yields of the objective isoprene. Although the by-products can be decomposed to isoprene, such decomposition makes the process complex and is not so advantageous from the industrial viewpoint.

The reaction pressure is not required to control. Thus, the reaction may be effected under an autogenetic pressure acid, alone As the catalyst, there may be used a variety of substances which are acidic under the reaction conditions. Examples of such substance are as follows: inorganic acidic substances (e.g., hydrochloric acid, hydrobromic acid, sulfuric acid, sulfurous acid, phosphoric acid, metaphosphoric acid, boric acid, metaboric acid, chlorosulfonic acid, phosphorotungstic acid, borotungstic acid, aluminitic acid, thionyl chloride, phosphorus pentachloride, silica, alumina, chlorine, sulfuryl chloride, sulfur dioxide, disulfur trioxide, boron trifluoride, chromic acid, hydrogen sulfide, nitrous acid, phosphorous acid, silicic acid, stannic acid, telluric acid, thiosulfuric acid, boron oxide, carbon dioxide, carbonic acid, hypochloric acid), organic acidic substances (e.g., formic acid, acetic acid, monochloroacetic acid, dichloroacetic acid, trichloroacetic acid, chlorobenzoic acid, toluenesulfonic acid, chloropropionic acid, oxalic acid, cyanuric acid, hydroquinone, maleic acid, phenol, phthalic acid, propionic acid, succinic acid), chlorides, sulfates and phosphates of the elements of Group I to VIII (e.g., Fe, Cr, Al, Co, Ni, Cu, Zn, Cd, Mn) in the periodic table, cation exchange resins, etc. These substances may be used alone or in combination.

Examples of the solvent which may be used for the reaction medium include water, alcohols (e.g., methanol, ethanol, n-propanol, isopropanol, n-butanol, t-butanol, amyl alcohol, octanol, hexanol, ethylene glycol, propylene glycol, butylene glycol), ethers (e.g., furan, petroleum ether, tetrahydrofuran, propyl ether, dioxane, acetal, methylal, butyl methyl ether, ethyl ether), ketones (e.g., acetone, methyl ethyl ketone, methyl isobutyl ketone, ethyl butyl ketone), hydrocarbons (e.g., pentane, hexane, benzene, cyclohexane, heptane, methylcyclohexane, toluene, octane, ethylbenzene, cumene, cymene, xylene, decane), esters (e.g., methyl formate, methyl acetate, ethyl acetate, isopropyl acetate, n-propyl acetate, butyl acetate, amyl acetate, cyclohexyl acetate) and others (e.g., methylene chloride, carbon disulfide, chloroform, sulfur dioxide, carbon tetrachloride, acetonitrile, 1,2-dichloropropane, acetic acid, formic acid, morpholine, mesityl oxide, carbon dioxide, chlorobenzene, ethylene glycol monomethyl ether, ethylene glycol monoisopropyl ether, dimethylformamide, anisole, methoxybutanol, furfural, diacetone alcohol, methoxybutyl acetate, diethylformamide, phenol, diethyleneglycol dibutyl ether, diethylene glycol diethylene ether, dimethylsulfoxide, ethylene glycol diacetate, N-methylpyrrolidone, ethylene glycol dibutyl ether, benzyl alcohol, nitrobenzene, sulforane, glycerol, ethyl chloride, ethylidene chloride, ethylene chloride, 1,1,1-trichloroethane, 1,1,2-trichloroethane, vinylidene chloride, 1,2-dichloroethylene, 1,1,1,2-tetrachloroethane, 1,1,2,2-tetrachloroethane, trichloroethylene, pentachloroethane, tetrachloroethylene, hexachloroethane). These solvents may be used alone or in combination.

Among the above solvents, t-butanol forms an equilibrium with isobutene and, when t-butanol or isobutene is employed in excess, a part of the same is converted into the other. Thus, t-butanol exists always in the reaction system and its express addition is not always required. The addition of such a solvent as 1,4-dioxane or toluene is effective in increasing the yield of the objective isoprene. Further, the simultaneous use of such a surfactant as polyethylene glycol octylphenyl ether or choline chloride is favorable in affording a better result.

The starting materials in the process of the present invention are isobutene and formaldehyde, or isoprene glycol or its acid ester, of which the acid part may be an organic acid (e.g., formic acid, acetic acid, oxalic acid, chloroacetic acid, dichloroacetic acid, trichloroacetic acid, bromoacetic acid, succinic acid, butyric acid) or an inorganic acid (e.g., metaboric acid, boric acid, boron oxide, aluminum hydroxide, sulfur dioxide, sulfurous acid, thiosulfuric acid, phosphoric acid, pyrophosphoric acid, sulfuric acid, silicic acid, stannic acid, carbon dioxide). When the acid part is a dibasic acid, the acid ester may be either monoester or diester. In case of, for instance, the ester with boric acid, it may be monoester, diester or triester.

The starting isobutene is not necessarily required to be pure. It may be such an impure one as the so-called "B-B fraction" (the $C_4$ fraction obtained by distilling naphtha cracking gas and mainly consisting of butane, butene and butadiene) or the so-called "spent B-B fraction" (the $C_4$ fraction obtained by excluding butadiene from the B-B fraction). Sometimes, it may be diluted with a suitable diluent such as nitroben, carbon dioxide, carbon monooxide, nitrogen monooxide or sulfur dioxide. The diluent may be also served as an additive for carrying out the reaction efficiently.

The starting formaldehyde may be used as such or in the state of aqueous solution, paraform or the like.

The proportion of isobutene and formaldehyde may be optionally selected. In general, the molar ratio of isobutene to formaldehyde is preferred to be from 1 : 1 to 10 : 1. When t-butanol is used as the solvent, isobutene is not necessarily required to use, because a part of the t-butanol is converted into isobutene due to the equilibrium between them.

The concentration of the catalyst in the reaction system is usually not more than about 5 % by weight, preferably from about 1 to about 5 % by weight, on the basis of the total weight of the reaction mixture.

Practical and presently preferred embodiments of the present invention are illustratively shown in the following Examples wherein parts and % are by weight unless otherwise indicated and the relationship between parts by weight and parts by volume corresponds to that between grams and milliliters.

EXAMPLE 1

In a glass lining autoclave equipped with an agitator, a mixture of 10 parts by volume of 45 % aqueous solution of formaldehyde (containing about 5 % of methanol) and 3 parts by volume of t-butanol is charged, and ferrous chloride is added thereto in an amount of 5 % to the above mixture. Thereafter, isobutene is charged into the autoclave in a molar ratio of 6.9 to formaldehyde. Stirring is then started, and the autoclave is placed in a preheated oil bath. After the inner temperature reaches to 160°C, the reaction is carried out for 10 minutes. The autoclave is taken out from the oil bath, cooled in ice-water and then placed in a bath of Dry Ice-methanol to cool at −15° to −20°C, whereby the water layer in the autoclave is solidified. The contents are then removed to a glass made vessel cooled with Dry Ice-methanol below −15°C while avoiding the evaporation of the unreacted isobutene. The oil layer is almost colorless and transparent, whereas the solidified water layer is pale yellow. By gas chromatographic analysis of isoprene in the oil layer, it is confirmed that the yield of isoprene based on formaldehyde is 84 mol %.

EXAMPLE 2

As in Example 1, the reaction is carried out but at 150°C for 25 minutes. The reaction mixture is subjected to gas chromatography whereby the yield of isoprene based on formaldehyde is confirmed to be 82 mol %.

EXAMPLE 3

As in Example 1, the reaction is carried out but at 140°C for 40 minutes. The reaction mixture is subjected to gas chromatography whereby the yield of isoprene based on formaldehyde is confirmed to be 78 mol %. Production of the materials having higher boiling points than t-butanol has is recognized.

EXAMPLES 4 to 27

As in Example 1, the reaction is carried out but using a variety of catalysts at 160°C for 2 or 4 hours without stirring. The reaction mixture is subjected to gas chromatography whereby the yield of isoprene based on formaldehyde is confirmed. The results are shown in the following table:

Table 1

| Ex. No. | catalyst | Reaction time (hrs.) | Yield of isoprene based on formaldehyde (mol %) |
|---|---|---|---|
| 4 | Ferrous chloride | 2 | 65 |
| 5 | Chromic chloride | 2 | 51 |
| 6 | Aluminum chloride | 2 | 52 |
| 7 | Ferrous sulfate | 4 | 53 |
| 8 | Aluminum sulfate | 4 | 41 |
| 9 | Ferric sulfate | 4 | 38 |
| 10 | Nicklelic chloride | 4 | 39 |
| 11 | Ferric chloride | 2 | 31 |
| 12 | Cobaltous chloride | 4 | 36 |
| 13 | Cuprous chloride | 4 | 31 |
| 14 | Cobaltic chloride | 4 | 33 |
| 15 | Chromous phosphate | 4 | 42 |
| 16 | Chromic phosphate | 4 | 40 |
| 17 | Manganese chloride | 4 | 29 |
| 18 | Cadmium chloride | 2 | 25 |
| 19 | Zinc chloride | 2 | 16 |
| 20 | Magnesium sulfate | 4 | 4 |
| 21 | Calcium sulfate | 4 | 2 |
| 22 | Cupric chloride | 2 | 8 |
| 23 | Magnesium chloride | 2 | 10 |
| 24 | Stannous chloride | 2 | 5 |
| 25 | Palladium chloride | 2 | 4 |
| 26 | Bismuth chloride | 2 | 4 |
| 27 | Lithium chloride | 2 | 6 |

Reference Example 1

As in Example 1, the reaction is carried out but at 190°C. The reaction mixture is subjected to gas chromatography whereby the yield of isoprene based on formaldehyde is confirmed to be 37 mol %. The reaction mixture is colored in blackish brown.

Reference Example 2

As in Example 1, the reaction is carried out but at 100°C for 4 hours. The reaction mixture is subjected to gas chromatography whereby no material production of isoprene is confirmed.

Example 28

In a glass lining autoclave equipped with an agitator, 8 parts of 37 % aqueous solution of formaldehyde and 46 parts of t-butanol are charged. A solution of 1.2 parts of aluminum chloride in 15 parts of water is admitted in a glass tube, and the glass tube is sealed. The sealed tube is placed in the autoclave, and the autoclave is heated in an oil bath. When the inner temperature reaches to 160°C, the glass tube is broken, and stirring is started. After continuing the reaction for 30 minutes, the autoclave is taken out from the oil bath and cooled in ice-water. The gas in the autoclave is gradually released and absorbed in isopropanol. The residual oil layer is separated from the water layer, combined with the above isopropanol solution and subjected to gas chromatography whereby the yield of isoprene based on formaldehyde is confirmed to be 78 mol %.

Example 29

Using an ion exchange resin Amberlite IR-120 as the catalyst, 427 parts of isobutene and 262 parts of water are reacted at 104°C under 28 atm, whereby a mixture of 359 parts of t-butanol, 170 parts of isobutene and 179 parts of water is produced. The mixture is used itself as the starting material for production of isoprene without separation into each component.

In an autoclave equipped with an agitator, a solution of 8 parts of ferrous chloride in 58 parts of 45 % aqueous solution of formaldehyde is charged, and the autoclave is heated at 170°C in an oil bath. The previously prepared and preheated mixture containing isobutene is added thereto, and the resultant mixture is stirred at 170°C for 55 minutes. The outlet valve of the autoclave is gradually opened, and a gaseous mixture of isoprene, isobutene and t-butanol is taken out to absorb into isopropanol. The isopropanol solution is subjected to gas chromatography whereby the yield of isoprene based on formaldehyde is confirmed to be 82 mol %. Since the amount of isobutene is rather increased after the reaction, the production of isoprene from t-butanol and formaldehyde is assumed.

Example 30

As in Example 28, the reaction is carried out but using ferrous chloride as the catalyst. The reaction mixture is subjected to gas chromatography whereby the yield of isoprene based on formaldehyde is confirmed to be 79 mol %.

Example 31

As in Example 28, the reaction is carried out but at 140°C for 40 minutes. The reaction mixture is subjected to gas chromatography whereby the yield of isoprene based on formaldehyde is confirmed to be 61 mol %.

Examples 32 to 55

In a glass tube, 68 parts of t-butanol, 10 parts of 37 % aqueous solution of formaldehyde, 26 parts of water and 2.4 parts of a catalyst are charged, and the glass tube is sealed. The sealed tube is accommodated in a reaction vessel and the reaction vessel is heated in an oil bath at 160°C for 18 minutes. The sealed tube is taken out and cooled with ice-water and then with Dry Ice-methanol of −10° to −15°C, whereby the water layer is solidified. The oil layer is separated and subjected to gas chromatographic analysis for determination of the yield of isoprene. The results are shown in the following table:

Table 2

| Example No. | Catalyst | Yield of isoprene based on formaldehyde (mol %) |
|---|---|---|
| 32 | Ferrous chloride | 82 |
| 33 | Chromic chloride | 79 |
| 34 | Aluminum chloride | 81 |
| 35 | Ferrous sulfate | 76 |
| 36 | Aluminum sulfate | 64 |
| 37 | Ferric sulfate | 62 |
| 38 | Nickelic chloride | 68 |
| 39 | Ferric chloride | 60 |
| 40 | Cobaltous chloride | 65 |
| 41 | Cuprous chloride | 57 |
| 42 | Cobaltic chloride | 58 |
| 43 | Chromous phosphate | 63 |
| 44 | Chromic phosphate | 61 |
| 45 | Manganese chloride | 42 |
| 46 | Cadmium chloride | 38 |
| 47 | Zinc chloride | 27 |
| 48 | Magnesium sulfate | 8 |
| 49 | Calcium sulfate | 3 |
| 50 | Cupric chloride | 11 |
| 51 | Magnesium chloride | 22 |
| 52 | Stannous chloride | 9 |
| 53 | Palladium chloride | 6 |
| 54 | Bismuth chloride | 5 |
| 55 | Lithium chloride | 8 |

Reference Example 3

As in Example 28, the reaction is carried out but at 210°C. The reaction mixture is subjected to gas chromatography whereby the yield of isoprene based on formaldehyde is confirmed to be 27 mol %. The oil layer of the reaction mixture is colored in blackish brown. Production of polymers in a relatively large amount is recognized.

Examples 56 to 61

In a glass lining autoclave equipped with an agitator, there are charged 112 parts of t-butanol, 111 parts of water, 45 parts of isoprene glycol (purity, 90 %) and 264 parts of benzene in this order, and a sealed glass tube accommodating 15 parts of aluminum chloride is placed therein. The autoclave is flushed with nitrogen gas and heated in an oil bath. When the inner temperature reaches to a certain temperature, stirring is started whereby the sealed tube is broken. After the reaction is continued for a certain duration, the autoclave is cooled to room temperature, and the gas in the autoclave is released to make an atmospheric pressure and collected in a trap cooled with Dry Ice-acetone. The liquid remaining in the autoclave is diluted with n-butanol, combined with the liquid collected in the trap and subjected to gas chromatographic analysis. The results are shown in the following table wherein the results of some Reference Examples are also shown:

Table 3

| Example No. | Reaction temperature (°C) | Reaction time (minutes) | Yield of isoprene based on isoprene glycol (mol %) |
| --- | --- | --- | --- |
| 56 | 160 | 10 | 81 |
| 57 | 160 | 20 | 92 |
| 58 | 140 | 40 | 91 |
| 59 | 140 | 60 | 99 |
| 60 | 110 | 180 | 45 |
| 61 | 180 | 10 | 35 |
| Reference Example No. 4 | 80 | 180 | 0 |
| Reference Example No. 5 | 190 | 10 | trace |

The use of isoprene glycol diacetate in place of isoprene glycol in the above procedure affords the same results as above.

What is claimed is:

1. A method for producing isoprene which comprises reacting isobutene with a reactant selected from the group consisting of formaldehyde, isoprene glycol and an ester of isoprene glycol and an acid at a molar ratio of isobutene to reactant of 1:1 to 10:1 in an aqueous solvent system comprising water or a mixture of water with t-butanol in the liquid phase in contact with a catalyst selected from the group consisting of aluminum chloride, ferrous chloride, ferric chloride, chromic chloride, cobaltous chloride, cobaltic chloride, nickelic chloride, cuprous chloride, manganese chloride, cadmium chloride, ferrous sulfate, ferric sulfate, aluminum sulfate, chromic phosphate and chromous phosphate at a temperature of from 110°C to 180°C and under autogenetic pressure, the concentration of the catalyst being from about 1 to 5% by weight on the basis of the total weight of the reaction mixture.

2. The method according to claim 17, wherein said acid is selected from the group consisting of formic acid, acetic acid, oxalic acid, chloroacetic acid, dichloroacetic acid, trichloroacetic acid, bromoacetic acid, succinic acid and butyric acid.

3. The method according to claim 1, wherein said acid is selected from the group consisting of metaboric acid, boric acid, aluminitic acid, sulfur dioxide, sulfurous acid, thiosulfuric acid, phosphoric acid, pyrophosphoric acid, sulfuric acid, silicic acid, stannic acid and carbon dioxide.

4. The method according to claim 1, wherein said acid is acetic acid.

5. The method according to claim 1, wherein said temperature is about 140°C to 160°C.

6. The method according to claim 1, wherein said molar ratio is at least about 6.

7. The method according to claim 6, wherein said molar ratio is at least about 6.9.

8. The method according to claim 1, wherein byproducts are recycled to the reaction system.

9. The method according to claim 1, wherein said isobutene is the decomposition product of t-butanol.

10. The method according to claim 1, wherein said reactant is formaldehyde, wherein said molar ratio is about 7, wherein said catalyst is ferrous chloride, and wherein said temperature is about 140°C to 160°C.

11. The method according to claim 1, wherein said reactant is formaldehyde, said catalyst is aluminum chloride, said molar ratio is about 6, and wherein said temperature is about 160°C.

12. The method according to claim 1, wherein said reactant is formaldehyde, said catalyst is ferrous chloride, said molar ratio is about 8, and said temperature is about 170°C.

13. The method according to claim 1, wherein said catalyst is ferrous chloride.

14. The method according to claim 1, wherein said catalyst is chromic chloride.

15. The method according to claim 1, wherein said catalyst is aluminum chloride.

16. The method according to claim 1, wherein said catalyst is ferrous sulfate.

17. The method according to claim 1, further comprising recovering isoprene from said aqueous solvent system.

18. The method according to claim 17, wherein said catalyst is ferrous chloride.

19. The method according to claim 17, wherein said catalyst is chromic chloride.

20. The method according to claim 17, wherein said catalyst is ferrous sulfate.

21. The method according to claim 17, wherein the aqueous solvent medium contains 1,4-dioxane or toluene.

22. The method according to claim 17, wherein the aqueous solvent system contains a surfactant selected from the group consisting of polyethylene glycol octylphenyl ether and choline chloride.

23. The method according to claim 17, wherein said acid is selected from the group consisting of formic acid, acetic acid, oxalic acid, chloroacetic acid, dichloroacetic acid, trichloroacetic acid, bromoacetic acid, succinic acid and butyric acid.

24. The method according to claim 17, wherein said acid is selected from the group consisting of metaboric acid, boric acid, aluminic acid, sulfur dioxide, sulfurous acid, thiosulfuric acid, phosphoric acid, pyrophosphoric acid, sulfuric acid, silicic acid, stannic acid and carbon dioxide.

25. The method according to claim 17, wherein the catalyst is aluminum chloride.

26. The method according to claim 17, wherein said acid is acetic acid.

27. The method according to claim 17, wherein said temperature is about 140°C to 160°C.

28. A method for producing isoprene which comprises reacting t-butanol with a reactant selected from the group consisting of formaldehyde, isoprene glycol and esters of isoprene glycol and an acid at a molar ratio of t-butanol to reactant of 1:1 to 10:1 in a medium of water in the liquid phase in contact with a catalyst selected from the group consisting of aluminum chloride, ferrous chloride, ferric chloride, chromic chloride, cobaltous chloride, cobaltic chloride, nickelic chloride, cuprous chloride, manganese chloride, cadmium chloride, ferrous sulfate, ferric sulfate, aluminum sulfate, chromic phosphate and chromous phosphate at a temperature of from 110°C to 180°C and under autogenetic pressure.

* * * * *